United States Patent [19]

Berstein et al.

[11] Patent Number: 4,799,839

[45] Date of Patent: Jan. 24, 1989

[54] METHOD AND APPARATUS FOR PERFORMING A ROTARY BROACHING OPERATION PARTICULARLY ON WORK PIECES OF ROTATIONAL SYMMETRY

[75] Inventors: Garri Berstein, Erkelenz; Hans W. Obrig, Essen; Helmut Wittkopp, Erkelenz; Hermann Wolters, Moenchengladbach, all of Fed. Rep. of Germany

[73] Assignee: Wilhelm Hegenscheidt GmbH, Erkelenz, Fed. Rep. of Germany

[21] Appl. No.: 109,932

[22] Filed: Oct. 16, 1987

[30] Foreign Application Priority Data

Oct. 21, 1986 [EP] European Pat. Off. .......... 86 114 599

[51] Int. Cl.$^4$ .............................................. B23D 37/00
[52] U.S. Cl. ...................................... 409/244; 409/59; 409/287; 409/268
[58] Field of Search ................... 409/244, 59, 287, 268

[56] References Cited

U.S. PATENT DOCUMENTS 4,294,568 10/1981 Lypowsky et al. ................. 409/244
4,531,868 7/1985 Gabriele .............................. 409/244

FOREIGN PATENT DOCUMENTS 2041804 9/1980 United Kingdom ................ 409/244

Primary Examiner—Leon Scott, Jr.
Attorney, Agent, or Firm—W. G. Fasse; D. H. Kane, Jr.

[57] ABSTRACT

Work pieces, especially of rotational symmetry, are machined in a rotary broaching operation. The machine tool for this purpose has a tool carrier carrying a plurality of cutting edges arranged on a curved path in a radial work piece plane. In order to reduce down-time and to simplify the construction of the broaching apparatus, the insertion of a work piece blank into the apparatus and the removal of a finished work piece from the apparatus are preferably performed without interrupting the motions of a tool carrier. For this purpose the tool carrier is provided with a zone which is free of cutting tool edges. This tool free zone of the tool carrier is located downstream of the last cutting edge as viewed in the rotational direction of the tool carrier. This feature avoids the need for a return stroke of the tool carrier. Accordingly, respective return slides and return controls are also obviated. The apparatus is equipped with angular sensing devices for ascertaining the angular positions of the tool carrier at the beginning and at the end of a work cycle to provide respective control signals for the insertion and removal of a work piece in the zone without cutting edges and to start a new work cycle when a work piece blank is inserted into the machine tool.

23 Claims, 4 Drawing Sheets

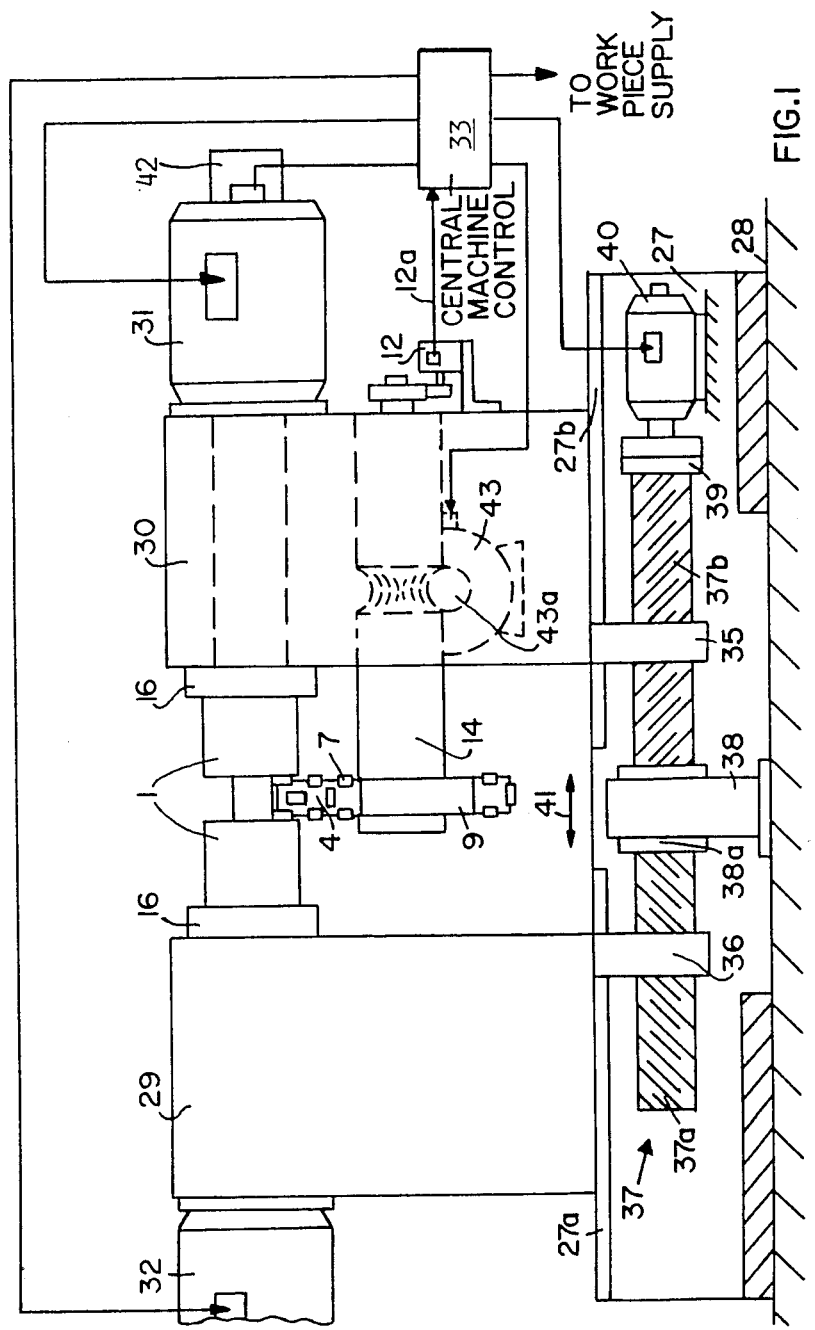

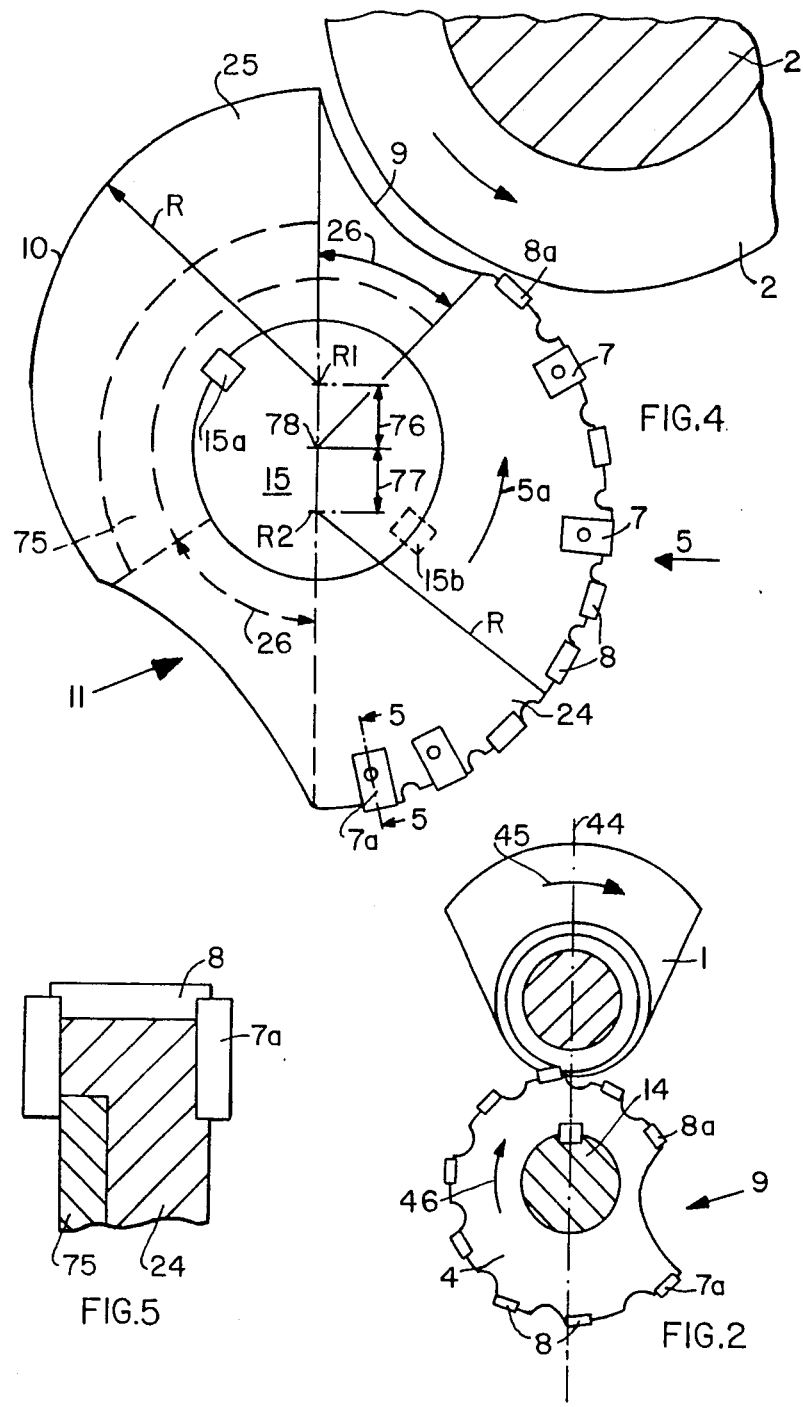

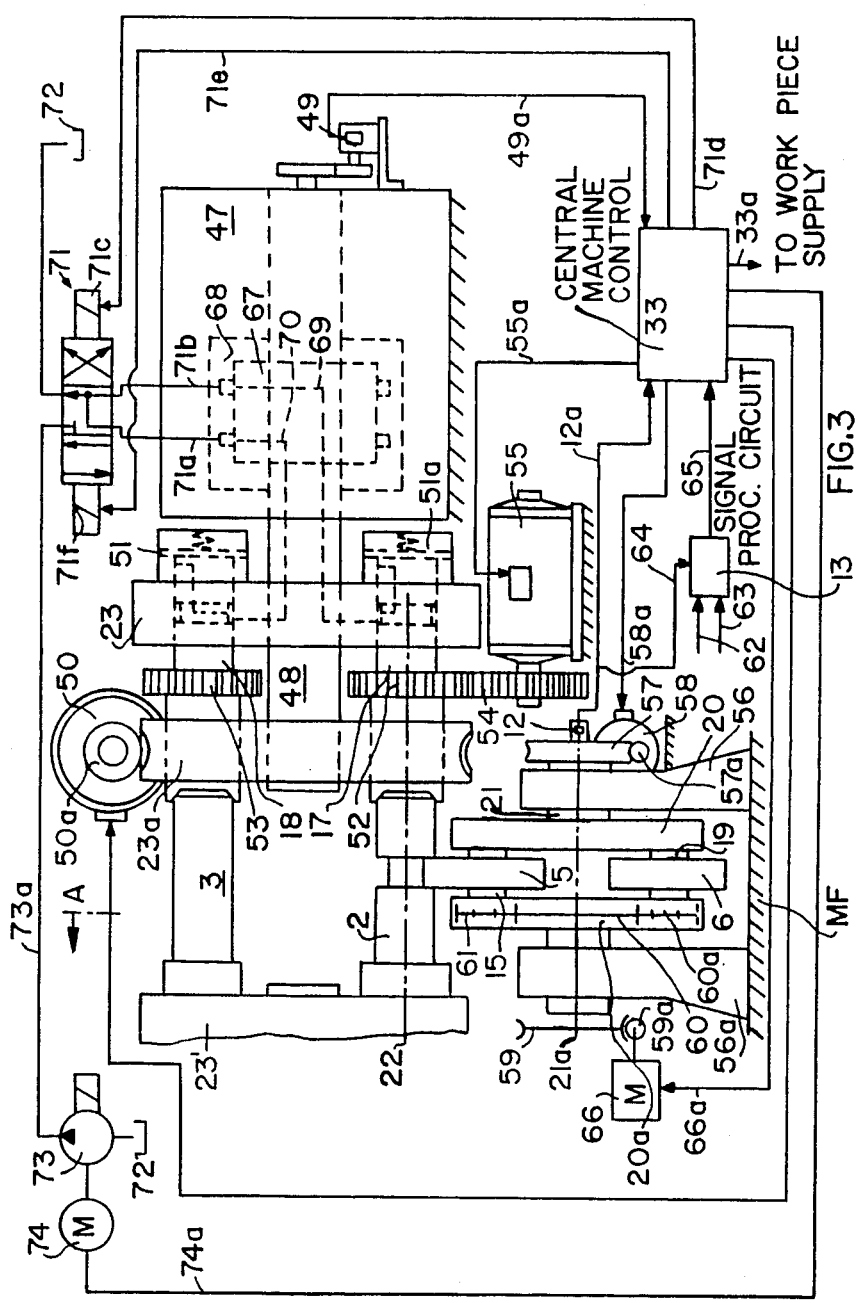

METHOD AND APPARATUS FOR PERFORMING A ROTARY BROACHING OPERATION PARTICULARLY ON WORK PIECES OF ROTATIONAL SYMMETRY

CROSS REFERENCE TO RELATED APPLICATIONS

The present application relates to U.S. Ser. No.: 109,935, filed on Oct. 16, 1987, entitled TURN BROACHING TOOL; and also relates to U.S. Ser. No.: 109,934, filed on Oct. 16, 1987 entitled: MACHINE TOOL FOR BROACHING CRANKSHAFT CONNECTING ROD BEARINGS.

FIELD OF THE INVENTION

The invention relates to a method and apparatus for performing a rotary broaching operation on work pieces of rotational symmetry. The apparatus includes a tool carrier defining a radial plane relative to the work piece and carrying a plurality of tools having cutting edges along a curved path for engagement with a work piece.

DESCRIPTION OF THE PRIOR ART

Method and devices of the type described above are known in the art, for example from German Patent Publication (DE-OS) No. 3,340,830. Conventional machines of this type have, however, the disadvantage that after the broaching operation is completed, the work piece must be removed and thereafter the broaching table must be moved back to its starting position along its entire long work stroke or displacement. This step is necessary prior to the insertion of the next work piece. The time needed for moving the broaching table back into the starting position is considered to be a dead time and the accumulation of such dead times is undesirable.

It has, however, been suggested to construct the broaching tools not as linear broaching tools that must be displaced during the machining operation, but rather to uniformly distribute the cutting elements of the broaching tools along a spiral contour and over the entire circumferential range of 360°. A respective sketch is shown in a brochure entitled "Neues Fertigungsverfahren fuer die Massenproduktion" (New Manufacturing Method For Mass Production) published by the Firm Heinlein of 8502 Zirndorf, Western Germany.

The sketch is entitled "Rotation-Rotary Broaching". The broaching tool is not displaced on a slide for producing the feed advance motion. Rather, the broaching tool is rotated about an axis. The spirally rising contour of the line on which the cutting elements are arranged makes sure that the feed advance takes place with the required depth. This brochure does not disclose how the tool is supported, nor does it show how the tool is movable, except for the rotational movement.

The trade magazine "Maschinenmarkt" (1986) No. 34, page 28, center column, FIG. 8, shows an arrangement of three broaching tools, each on its own tool carrier. All tool carriers are arranged coaxially to the work piece axis. The cutting elements are arranged on the tool carrier along a curved path. The cutting elements are rotated by the tool carrier so that they move along said curved path. The cutting elements are arranged on the tool carrier along a circumferential range of less than 180°. This arrangement of the cutting tools on the tool carrier is intended to relieve the work piece of undesirable shearing forces which result from the machining operation. Any further information is not available from this just discussed publication. In any event, even this type of arrangement requires much dead time because a work piece exchange is possible only in the zone of the tool carrier which is free of the cutting tools. Thus, this tool free zone must be available for a time duration long enough to permit the work piece exchange. After the work piece has been exchanged, it is necessary to rotate the tool carrier through the entire tool free zone until the tools can again be engaged with the work piece. A reduction in the so-called dead times is not possible with such an arrangement.

OBJECTS OF THE INVENTION

In view of the foregoing it is the aim of the invention to achieve the following objects singly or in combination:

to provide a broaching method in which the dead times are substantially reduced and which can be performed by a broaching machine tool of simple construction;

to provide for a rapid work piece exchange without stopping the broaching tool or with stopping the broaching tool only for a very short time duration while in any event avoiding the return stroke or an empty movement of the broaching tool;

to control the tool location in such a way that the work piece exchange is properly synchronized with the cutting edge free zone of the broaching tool;

to provide a tool that can be assembled from different tool components for different purposes; and to provide a broaching machine tool which assures an overall simple construction with an advantageous access to the work piece as well as an advantageous removal of cutting chips.

SUMMARY OF THE INVENTION

In one embodiment of the method according to the present invention the loading and unloading of work pieces into the broaching machine tool can be accomplished without interrupting the motion of the tool carrier, whereby the loading and unloading takes place after the broaching operation has been completed by the last cutting edge in a zone following the last cutting edge which is free of cutting edges. As a result, the rotation of the broaching tool carrier can continue without modification of the completion of the work piece. For this purpose the last cutting edge on the tool carrier is followed by a zone free of cutting edges, whereby the work piece can be exchanged in this cutting edge free zone without any radial movement of the tool at this time. Modern robot equipment is quite capable of performing such a work piece exchange, for example, when the work pieces are smaller shafts or, for example, crankshafts of motor vehicle engines which can be exchanged in a few seconds. The gap or circumferential zone in the tool carrier without cutting edges can be so dimensioned that directly following the completion of the work piece exchange, the first cutting edge following the cutting edge free zone is located at the beginning of the next broaching sequence so that the machining of the work piece can be performed without delay. Thus, return movement times and idle times that are necessary in order to bring the tool into the new working position as was necessary heretofore, are either minimized or completely eliminated according to the invention. Simultaneously, the present machine construction does not require a separate slide with its drive and control for a radial movement of the tool carrier with its tools or cutting edges.

According to a modified version of the present method, the tool carrier, upon completion of the machining of a work piece by the last cutting edge carried by the tool carrier, is caused to continue to move, in the same direction, into a work piece exchange position in which it is stopped for the duration needed for the work piece exchange In this method also the above described advantages are achieved, even though control means are required for stopping the tool carrier in the work piece exchange position. It should be mentioned in this connection that the movement of the tool does not necessarily have to be exclusively a rotational movement about a fixed center point. This type of rotational movement is but one possibility of moving the cutting edges along a curved path. Further, the term "loading and unloading" in this context means the insertion of a work piece into the working zone of the respective tool and the removal of the finished work piece from the working zone of the respective tool.

According to the invention the tool carrier is provided with at least one zone which is free of cutting tool edges and that zone follows the last cutting tool edge as viewed in the movement direction of the tool carrier. This cutting edge free zone is moved into a position opposite to the work piece, where it may be stopped for the loading or unloading. In this manner the most simple possibility of moving the tool carrier into a work piece exchange position is provided.

According to the invention the machine for performing the present method comprises a work piece spindle and a tool carrier. The work piece spindle is mounted for rotation about the machine axis and it is positively driven. The tool carrier is mounted for movement relative to a work piece and carries cutting tool edges, whereby the tool carrier is so constructed that it makes possible a movement of the tool cutting edges along a curved path. The present apparatus also comprises means for sensing an angular position of the tool carrier at the beginning of a working cycle and another angular position of the tool carrier for the removal of a work piece, whereby the second angular position is such that a finished work piece may be removed since the tool carrier faces the work piece at this time with a zone free of cutting tool edges. Further, the sensor means for ascertaining the angular positions provide control signals for the loading and unloading of a work piece and at least one further control signal for starting a work cycle in response to a respective machine control. Thus, it is possible to employ simple means for ascertaining the proper position of the work piece for deriving from that position control signals for a work piece change and to control the apparatus accordingly.

The present apparatus is further equipped with drive means which permit moving the work piece spindle into a predetermined fixed angular position. This capability is especially advantageous if the work piece should have a nonsymmetrical shape as is, for example, the case with a crankshaft. In this way it is possible to provide for a preferred work piece location for the work piece exchange which may then be performed when the work piece spindle has assumed a fixed angular position.

In an embodiment of the present apparatus which has at least two tool carriers, it is possible to use the respective tools either alternately or simultaneously, whereby the respective tools may be of the same kind or of different kinds. These tools may be secured to the respective tool carrier in different positions.

In another embodiment of the invention the tool carrier is arranged in at least one rotatable carrier drum. This feature enables moving the tools simply and effectively into the working position and out of the working position. Another possibility of this feature is that the rotational carrier drum may provide an additional tool feed advance or it may exclusively provide the tool feed advance.

By arranging the rotational axis of the carrier drum for the tool carrier outside of the machine axis, the apparatus according to the invention has space for a work piece exchange without any problems since convenient access is provided to the location where the work piece exchange needs to take place, whereby unnecessary down times are avoided. This feature is further enhanced by arranging the rotational axis of the tool carrier drum in parallel to the machine axis.

By constructing the tool carriers as spindles which are arranged in parallel to each other, the mounting in bearings of these tool carriers and their rotational drive is simple and the mounting of the rotational drive itself is simple. Moreover, the rotational drive of the respective tools is also simple in such an arrangement so that the required tool movements can be obtained in the simplest manner.

By arranging the tool carrying spindles in rotatable carrier drums, the above mentioned advantages are achieved and it is particularly simple to mount the spindles as tool carriers in a carrier drum. By mounting the spindle carrier drums so that they are movable in at least two predetermined angular positions, it is possible to move the tools simply and automatically into the desired position.

In one embodiment of the invention at least two work piece spindles are provided, whereby the respective machine tool becomes more flexible in its adaptation to different machining requirements and additionally achieves a higher productivity in the form of large numbers of parts manufactured one after another in an economical manner. However, this feature of two work piece spindles is not limited to making the same type of work piece in large numbers. Rather, this type of construction in combination with the above mentioned features results in a machine tool in which work pieces of different kinds may be machined in different machining positions with different tools.

According to the invention cutting tools with cutting edges are arranged along the circumference of the tool carrier, except in a circumferential zone which is left free of cutting tools to form a work piece removal gap. In this manner it is possible to assemble a tool of several individual components, whereby these individual components may be left out along a certain portion of the circumference to form said work piece removal gap. Thus, it is not necessary to form the tool carrier itself with a special removal gap. Besides, the attachment of cutting tool edges along the circumference of a tool carrier simplifies the tool exchange.

The machine tool according to the invention comprises a machine bed with at least two head stocks which are arranged opposite each other and wherein the work piece spindles have a common central axis. In this embodiment there is at least one further head stock for the rotatably drivable tool carrier so arranged that the central axis of each tool carrier spindle extends in parallel to the central axis of the work piece spindles. This arrangement results in a simple and clear location of the machine tool components while simultaneously permitting an easy tool handling.

In the foregoing embodiment it is preferable that each head stock for the tool carriers is displaceable and positionable in parallel to the central axis of the work piece spindles. With this feature it is possible to allocate respective tools to axially different work piece positions and to axially different locations on the work piece that needs to be machined.

By mounting the head stocks for one tool carrier so that the respective head stock is displaceable and positionable in a direction vertically to the central axis of the tool carrier it is possible to adapt the machine tool to different diameters of the tools on the one hand, and to adjust the tools to different finish diameters of the work piece on the other hand, while the tools have the same dimensions in both instances.

In the embodiment in which each head stock for a work piece spindle is displaceable and positionable, work pieces of different length may be machined.

The present teaching may be realized in a machine tool having a horizontal machine bed as well as in a machine tool having a portal a gantry type of machine bed. In both instances there is easy access to the work piece and easy removal of chips resulting from the machining operation. In the gantry type machine bed a chip pit may be located below the machining tools and the work pieces may travel from one side of the machine through the machine to the other side.

By arranging the tool head stock above the respective work piece head stock, it is possible to further improve the access to the work piece so that the present machine tool is able to easily cooperate with a robot supplying and removing the work pieces. This arrangement has the further advantage that contaminations and falling chips cannot impair the operation of the tool and of the tool carrier.

By making the rotational speed of the work piece spindle and/or of the tool carrier variable, it is possible to keep the volume of cut-off chips constant per unit of time or to vary that volume. As a result, the adaptation of the feed advance speed and of the chip thickness can easily be made with due regard to the vibrational characteristics of the work piece and/or to the cutting capacity of the cutting tools or plates presently in operation. As a result, the output of the machine tool and the quality of that output can be optimized.

BRIEF DESCRIPTION OF THE DRAWINGS

In order that the invention may be clearly understood, it will now be described, by way of example, with reference to the accompanying drawings, wherein:

FIG. 1 is a side view of an apparatus according to the invention shown partially in section and illustrating a machine tool constructed in the manner of a lathe including a broaching tool for machining a work piece inserted into the machine tool;

FIG. 2 illustrates in a sectional view the relationship between a work piece and the tool in an apparatus according to FIG. 1;

FIG. 3 shows substantially the right-hand half of a broaching machine tool according to the invention in a schematic side view;

FIG. 4 illustrates a possible work piece removal position and a tool in a side view;

FIG. 5 shows a sectional view along section line 5—5 in FIG. 4; and

Figure 6:
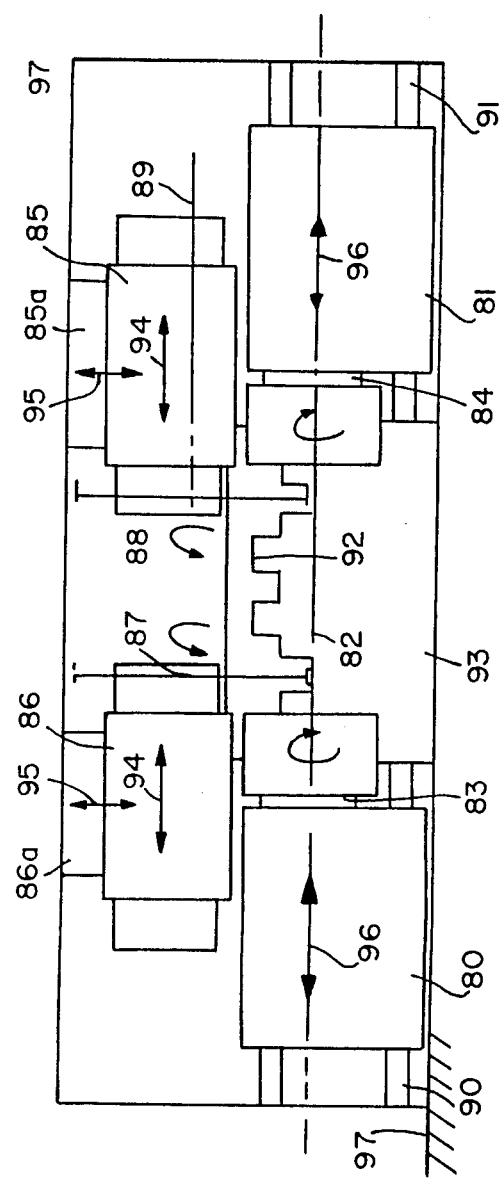
FIG. 6 illustrates a side view of a broaching machine tool according to the invention.

DETAILED DESCRIPTION OF PREFERRED EXAMPLE EMBODIMENTS AND OF THE BEST MODE OF THE INVENTION

Referring to FIG. 1 the basic construction of the present broaching apparatus can be compared to that of a lathe. A machine bed 27 is mounted on a foundation 28. The machine bed 27 carries two head stocks 29 and 30 which are movable horizontally on guides 27a and 27b of the machine bed 27. Each head stock 29, 30 carries its own work piece spindle 16. These work piece spindles 16 are rotatably mounted in conventional bearings in the respective head stock 29 and 30 and are rotatably driven by motors 31 and 32. Each spindle 16 is equipped with a conventional chuck for holding a work piece 1 when the work piece is rotated with the aid of the motors 31 and 32 which are energized and controlled in synchronism through a central machine control 33. However, depending on the type of work piece it is possible to use but one motor 31 or 32 in which case the other spindle 16 is entrained by the drive of the first mentioned spindle so that it idles along so to speak.

The head stocks 29 and 30 are movable horizontally toward and away from each other through a spindle drive comprising the spindle 37 rotatable in a bearing 38a mounted in a bearing pedestal 38 for driving the spindle 37 with a motor 40 mounted on the machine bed 27. The left-hand end 37a of the spindle 37 has a threading with a pitch in one direction and the right-hand end 37b of the spindle 37 has a threading with a pitch in the opposite direction. A spindle nut 36 rigidly connected to the head stock 29, engages the head stock 29 with the left-hand end 37a of the spindle. Another spindle nut 35 rigidly connected to the head stock 30 engages the right-hand end spindle 37b. Since the spindle is rotatable, but not displaceable in an axial direction, it can drive the two head stocks 29 and 30. For this purpose the spindle 37 is connected to the motor 40 through a clutch 39. The motor 40 is connected to the central machine control 33. Thus, by moving the two head stocks 29 and 30 as indicated by the double arrow 41 it is possible to either clamp a work piece 1 between the tracks of the spindles 16 or to release a work piece. However, rather than moving the head stocks 29 and 30 it is quite possible to construct the spindles 16 with their chucks for the mounting and dismounting of a work piece. Thus, the spindles 16 or portions thereof could be made to be axially displaceable. Such structures are known and hence it is not necessary to describe them in more detail.

In order to control the just described operation with reference to a desired angular position, the motor 31 which drives the right-hand spindle 16 is provided with an angular sensor 42 providing a respective signal that defines the rotational position of the rotor of the motor 31. This signal is supplied to the machine control 33 for the respective use in positioning the spindles 16. This information is required, especially when the work piece 1 is, for example, a crankshaft.

A tool carrier 14 constructed as a spindle is rotatably mounted in the head stock 30 below the work piece spindle 16. The rotational axis of the spindle type tool carrier 14 extends in parallel to the work piece spindle 16. The tool carrier 14 is driven by a motor 43 through a worm gear 43a. The motor 43 is controlled through the central machine control 33. A further angular rotation sensor 12 is operatively connected to the tool carrier 14 to provide a second angular position representing signal on a conductor 12a to the central machine control 33. Thus, the instantaneous angular position of the tool carrier 14 is always known. Additionally, the signal on the conductor 12a provides information regarding the rotational speed of the tool carrier 14.

The tool carrier 14 carries in a cantilevered manner, a tool 4 having attached thereto individual cutting edges 7 which are presented for a broaching operation between the two head stocks 29 and 30. FIG. 2 shows the relative position between the work piece 1 and the tool 4 during a broaching operation.

If, as shown in the embodiment of FIG. 1, the tool carrier 14 is rotatable but axially fixed in the head stock 30, then the tool 4 retains its relative position to the head stock 30 at all times. This feature may be advantageous, especially in connection with mass production if it is possible to clamp the work piece 1 each time in exactly the same position. However, it is also possible without any problems to construct the tool carrier 14, for example as a multispline shaft inside the head stock 30, whereby the worm gear 43a would be mounted on said multispline shaft for an axial displacement along the multispline shaft. The axial displacement of the tool carrier 14 along the multispline shaft can then be accomplished, for example, by a threaded spindle drive or by a hydraulic drive. However, it is also possible to arrange several tools 4 on the tool carrier 14 and to replace the illustrated cantilevered mounting of the tool carrier 14 by a bearing mounting at each end of the tool carrier 14. Thus, one end of the tool carrier 14 could be mounted in a bearing in the head stock 30 while the other end is mounted in a respective bearing in the head stock 29. Further, it is not absolutely necessary that the tool carrier 14 is located in a vertical plane through the longitudinal axis of the work piece spindle 16. Rather, the tool carrier 14 may be located just as well in a plane laterally displaced relative to the plane through the longitudinal axis of the work piece spindle 16. If we assume that the plane 44 in FIG. 2 is such a lateral plane, then an arrangement as shown in FIG. 4 is possible with the same relative relationship between the components.

A broaching operation is performed on a work piece 1 by starting the motor 31, and if necessary, also the motor 32, through the central machine control 33 so that it operates with the required r.p.m. for achieving a satisfactory cutting speed of the broaching operation on the tool 1 so that the tool 1 rotates with a corresponding speed. Prior to beginning the broaching operation, the tool 4 is so positioned that the zone 9 of the tool 4 which is free of tool cutting edges faces the work piece 1. The present tool 4 carries on its circumference on a spiral shaped path individual tool cutting edges 7 and 8. The cutting edge 8a is the first cutting edge to engage a work piece as viewed in the rotational direction of the tool 4. The cutting edge 7a is the last cutting edge to engage the work piece also as viewed in the rotational direction. During the broaching operation the work piece 1 rotates in the clockwise direction as indicated by the arrow 45 in FIG. 2. The tool 4 also rotates in the clockwise direction as indicated by the arrow 46. The tool 4 is driven through the tool carrier 14 by the motor 43. Due to the spiral arrangement of the tool cutting edges, the tool 4 penetrates deeper and deeper radially into the work piece 1 in the zone to be broached. During the rotational movement of the tool 4 eventually the last cutting edge 7a becomes effective on the work piece 1 for completion of the broaching operation. As soon as the last cutting edge 7a leaves the work piece, the zone 9 of the tool 4 which is free of cutting edges, comes into a position facing the work piece 1, whereby it is now possible to exchange the finished work piece 1 against a work piece yet to be machined while the tool 4 keeps rotating slowly in the direction of the arrow 46. As mentioned, the change of a work piece takes but a few seconds with the aid of, for example, a modern robot arm. For the work piece exchange the central machine control 33 supplies a respective signal to the motor 40 for moving the spindle 37 in such a way that the head stocks 29 and 30 move away from each other in the direction of the arrow 41. The information regarding the angular position at which this separation of the head stocks 29 and 30 may be carried out, is provided to the central machine control 33 by the angular sensor 12. However, before separating the head stocks 29 and 30, the respective motors 31 and 32 are stopped and such stopping provides information to the central machine control 33 for transmitting a respective instruction or information to the work piece supply robot which grabs the work piece 1 that has been finished and holds another work piece to be machined ready for insertion. Now the head stocks 29 and 30 are separated as mentioned above and the finished work piece is removed while a new work piece yet to be machined is inserted. When the new work piece is inserted, the robot supplies a respective signal to the central machine control 33, whereupon the motor 40 receives a drive signal so that the head stocks 29 and 30 are again moved toward each other for clamping the new work piece 1. During this operation the tool carrier 14 may keep continuously rotating. However, it is also possible to stop the rotation of the tool carrier 14 during the time when the work piece is being exchanged. The completion of a clamping of a work piece can be ascertained by the central machine control 33 for example through the current input to the motor 40 in response to which the central machine control 33 starts the motors 31 and 32 and if necessary, also the motor 43. If a defined angular position of the work piece spindles 16 is necessary for the exchange of a work piece, the machine control 33 receives a respective information from the first angular sensor 42.

The broaching operation itself employing curved cutting tools is known as such and therefore will not be described in further detail.

FIG. 3 shows an apparatus employing the basic structure of FIG. 1, however, having two work piece spindles and two tool carriers. For clarity of illustration only the right-hand half of the machine is shown. The left-hand half is mirror-symmetrical to the right-hand half with regard to the plane A.

Referring to FIG. 3, the embodiment comprises a head stock 47 cooperating with a respective opposite mirror symmetrical head stock not shown. A shaft 48 is rotatably mounted in the head stock 47. The rotational speed and the angular position of the shaft 48 are sensed by a selsyn unit 49 connected to the central machine control 34. The shaft 48 extends with its cantilevered arm into the work range between the head stocks 47. A spindle drum comprising a section 23 and a section 23a is rigidly secured to the shaft 48 for rotation with the shaft 48. The two sections 23 and 23a of the spindle drum are essentially two disks of which the disk 23a has a circumference constructed with a worm gear cooperating with a further worm gear 50a driven by the motor 50.

The spindle drum with its disks 23 and 23a comprises two bearings for a work piece spindle 17 and two bearings for a work piece spindle 18. The left-hand ends of each work piece spindle 17 and 18 comprises conventional chuck means for holding a work piece 2 or 3 respectively. The work piece spindles 17 and 18 are axially displaceable within the spindle drum 23, 23a. Such axial displacement of the spindles 17 and 18 may be accomplished, for example, with the aid of respective piston cylinder devices 51, 51a arranged at the right-hand end of the respective work piece spindles 17 and 18. The respective cylinder of the piston cylinder devices 51, 51a is secured to the drum disk 23. Each cylinder of the piston cylinder devices 51, 51a is equipped with a biasing spring shown in dashed lines for axially biasing the respective work piece spindle 17, 18 to perform a clamping movement and to provide the work piece clamping force. The application of a fluid under pressure to the respective cylinder device 51 counteracts the biasing force of the respective spring as will be described in more detail below.

Each work piece spindle 17 and 18 carries a respective gear wheel 52 or 53 between the individual disks 23, 23a. The gear wheels 52, 53 are rigidly secured to the respective work piece spindle for driving the work piece spindle. Each work piece spindle 17 and 18 is driven through the respective gear wheel 52, 53 and through a further gear wheel 54 driven by a motor 55. The motor 55 is connected through conductor means 55a to the central machine control 33 as shown in FIG. 3. Thus, the work piece spindles 17 and 18 are driven in response to control signals from the central machine control 33.

A tool carrier drum comprising two disks 20 and 20a is located in a position for applying the broaching tools 5 and 6 to the work piece 2, 3. The tools 5 and 6 are supported by tool carrier shafts 15 and 19 respectively. These tool carrier shafts 15 and 19 are rotatably mounted in the tooly carrying drum 20, 20a. The tool carrying drum 20, 20a is rotatable with a shaft 21 rotatably mounted in pedestals 56 and 56a. The rotational shaft 21 is rigidly connected to a worm wheel 57 driven by a motor 58 through a worm gear 57a. The motor 58 for rotating the tool carrying drum 20, 20a is connected through a conductor 58a to the central machine control 33 for energizing the motor 58.

The tools 5 and 6 are in turn rotatable with their carrier shafts 15 and 19. These shafts are driven through gears 60 and 61 as well as 60a. The gears 60, 60a, and 61 are driven through a shaft 21a rotatably and coaxially mounted relative to the shaft 21. The shaft 21a is driven by a worm wheel 59 cooperating with a worm gear 59a driven by a motor 66 connected through a control conductor means 66a to the central machine control 33. The shaft 21a is rigidly connected to the gear 60 mounted in the drum disk 20a for meshing with the pinion gear 60a and 61. The pinions 60a and 61 are rigidly connectable to the tool shafts 15 and 19, for example, through a clutch not shown. The rotation of the shafts 15 and 19 is sensed by angular sensors, not shown, for providing angular position representing signals to the control conductors 62 and 63 respectively. A circuit arrangement 13 analyzes the angular position representing signals and supplies these signals to the central machine control 33. The rotation caused by the worm wheel 57 is sensed by an angular rotation sensor 12 providing a control signal on a conductor 64 connected to the signal processing device 13 which in turn is connected through the conductor 65 to the central machine control 33.

The motor 66 is also connected through the conductor 66a to the central machine control 33 as mentioned above so that the rotation of the tools 5 and 6 may be centrally controlled. Each of these tools 5 and 6 has zones or sections 9 and 11 free of tool cutting edges as shown in FIG. 4. Section 10 of tool carrier portion 25 may carry cutting edges 7, 7a, 8, 8a as shown on tool carrier portion 24.

The shaft 48 shown in FIG. 3 is surrounded by a distribution ring 67 inside the head stock 47. The distribution ring 67 is surrounded by a fixed distribution connector 68. The shaft 48 is provided with hydraulic conduits 69 and 70 which lead from a control valve 71 through the work piece spindles 17 and 18 and through the spindle drum disk 23 to the front side of the pistons in the piston cylinder devices 51, 51a. The distribution connector 68 in turn is connected to the control valves 71 through conduits 71a and 71b leading into circular channels for connection to the rotating distribution ring 67.

The control valve 71 is constructed to take up three different switching positions. The valve 71 has four ports. The shown position in FIG. 3 is the central position in which both hydraulic conduits 69 and 70 are connected to a supply tank 72 of hydraulic fluid. The two other switching positions of the valves 71 make it possible to selectively apply hydraulic fluid under pressure to either the piston cylinder device 51 or to the piston cylinder device 51a. The operating solenoid 71c of the valve 71 is connected through control conductor means 71d to the central machine control 33. A hydraulic pump 73 driven by a motor 74 connected to the central machine control 33 through control conductor means 74a provides the required hydraulic pressure through a hydraulic duct 73a. A control output 33a from the central machine control 33 leads to a work piece supply, such as a robot, not shown since it is not part of the invention. Control conductor 71e connects the central machine control 33 to the other solenoid 71f of the valve 71 for switching the valve 71 in a direction opposite to the switching direction of solenoid 71c. The central machine control 33 makes sure that the operation of the broaching machine is synchronized with the supply and removal of work pieces through signals at its output 33a.

FIG. 3 further shows two work pieces 2 and 3 presently held in the respective work piece carrying spindles 17, 18. Work piece 2 has just been completed while work piece 3 has not yet been machined. Thus, work piece 2 must now be removed out of the working range of the tool 5 while the work piece 3 must be brought into a position for cooperation with the tool 5. The angular position sensor or selsyn device 12 provides a signal through the control conductor 64 to the signal processing device 13. Such signal contains information that the tool 5 has worked on the work piece 2 or is in working position (FIG. 1. If simultaneously a signal is present on the conductor 62 (FIG. 3) connected to a further angular sensor sensing the angular position of the tool 5, the respective information signifies that the tool 5 has assumed a work piece exchange position in which a section 9 free of cutting tool edges 7, 8 faces the work piece 2 as shown in FIG. 4. Thus, the signal processing circuit 13 provides an output signal on the conductor 65 to the central machine control [33]. The signal on the conductor 65 may be the output signal of a combination of three signal processing circuits of the type of 6FX1 126-8BA, Siemens conductors 62 and 64 in order to switch over the selected conductor to the conductor 65. The central machine control 33 causes the stopping of the motor 55 and causes the work piece supply robot to have an empty gripper tongue ready for removal of the finished work piece and to have a gripper tongue holding a new work piece also ready in the tool exchange position. Depending on the duration of the work piece exchange and on the size of the tool carrier section 9 or 11 free of cutting tool edges, it is possible for the central machine control 33 to either stop the motor 66 or to keep it running. It is also possible to keep the motor 66 running, but disengage the clutch for driving the pinion 61. At this point the central machine control 33 switches on the motor 50 to rotate the spindle drum 23, 23a by 180°. The respective angular information is supplied to the central machine control 33 by the angular sensor 49 through the conductor 49a. As a result of the 180° rotation, the work piece 3 is now in the position of the work piece 2 shown in FIG. 3 so that the gear wheel 53 meshes with the gear wheel 54 driven by the motor 55. The motor 50 is now caused to stop by a signal from the central machine control 33 so that the work piece 3 remains in the machining position while the motor 55 rotates the work piece 3. The tool 5 can now start the machining or broaching operation on the work piece 3. The work piece 2 is now in the upper position where it is taken up by a gripper of the supply robot now shown. As soon as the gripper holds the work piece 2, the central machine control 33 operates the valve 71 by energizing solenoid 71f through the conductor means 71e to move the valve piston to the left so that the conduit 71a is connected to the hydraulic fluid container or tank 72 while the conduit 71b is connected to the pressurized conduit 73a. As a result, the work piece spindle 17 is displaced backwardly in the direction of the machine axis 22 so that the work piece 2 may now be removed by the gripper operated by the supply robot. Simultaneously, the supply robot, through a further gripper, supplies a new work piece into the clamping position and this fact is reported to the central machine control [33] through a respective signal on the conductor 49a from the sensor 49, whereupon the central machine control 33 energizes the solenoid 71c through the conductor 71d to move the valve back into the shown central position. Thus, the conduit 69 is reconnected through the conduit 71b to the tank 72 while the axially effective spring in the fluid piston cylinder device 51a moves the work piece spindle 17 back into the forward position, thereby clamping the newly inserted work piece. Thereafter, the spindle drum 23, 23a can be rotated again by 180° so that the newly inserted work piece may be brought into a machining position for a broaching operation by the tool 5.

The tools 5, 6 shown in FIG. 3 are movable as described above. However, an apparatus of the invention constructed as shown in FIG. 3 can also be equipped with fixed tools 5, 6, as described above with reference to FIG. 1. Even with fixed tools a tool exchange is possible in the apparatus of FIG. 3. A rotational axis 21 is rigidly mounted in two pedestals 56 and 56a.

Referring again to FIG. 3, a broaching operation on the work pieces 2 or 3 may be performed by the tool 5 or by the tool 6, or if desired, in an alternate fashion by the tools 5 and 6 which are respectively brought into the machining position. If the tool 5 is to be exchanged, the machine may produce a respective control signal on the conductor 65 based on signals on conductor 64 from sensor 12 and on conductor 62 from a sensor of the rotation of the tool 5, on conductor 63 from a sensor of the rotation of the tool 6. The signal on conductor 65 is supplied to the central machine control 33. The instruction for the exchange of a tool may also be provided manually by the operator. For this purpose the central machine control 33 has a respective keyboard. In response to such a tool exchange signal, the central machine control 33 causes the motor 58 to rotate the tool carrier drum 20, 20a through the worm wheel 57 and worm gear 57a. When the rotation has passed through 180°, a respective signal is provided through the angular sensor 12 on the one hand through the conductor 64 to the circuit 13, and on the other hand through the conductor 12a directly to the central machine control 33 for stopping the motor 58. During the rotation or at the end of the rotation of the tool carrier drum 20, 20a, the angular position of the tool carrier shaft 19 is checked, for example through the control conductor 63 and supplied to the evaluating circuit 13 which also receives a signal on the conductor 64 to provide the above mentioned control signal on the conductor 65 to the central machine control 33 for supplying information which of the tools 5 or 6 is in the working position and what angular position the tool in the working position has. The actually sensed angular position is compared in the central machine control with a rated angular position. If the actually sensed position differs from the rated position, the central machine control 33 starts the motor 66 in the respective sense and also causes a closing of a coupling device between the respective gear wheel 61 or 60a and the corresponding tool carrier shaft 15 or 19 to thereby rotate the respective tool carrier and hence the tool or 6 into the proper position. The proper position is then sensed by the respective angular sensor of the tools 5, 6 and supplied through the circuit 13 to the central machine control [33] to provide information regarding the proper position of the tools 5, 6. A notational movement of the drum 20, 20a and thus of the respective tool carriers, can take place simultaneously with or independently of a rotational movement of the spindle drum 23, 23a. Rather than mounting the pedestals 56 and 56a rigidly to the machine frame MF, it is possible to mount these two pedestals on a slide for displacement in a direction perpendicularly to the direction of the axis 22 extending horizontally.

The tools used in the broaching machine tool of FIG. 3 may comprise tools with but one zone or section 9 free of cutting edges as shown in FIG. 2 or tools of the type shown in FIG. 4 may be used which have several zones 9 and 11 free of cutting edges. Referring to FIG. 4, the body 75 of the tool 5 comprises a portion 24 having a first section carrying the cutting tool edges 7, 7a, and 8 as well as 8a, and a second section 9 free of cutting edges. The body 75 has a further portion 25 with a section 11 free of cutting edges, and a section 10 that may be free of cutting edges, or the section 10 may be provided with cutting edges just as shown for the portion 24. The disk body 75 is rigidly secured to the drive shaft 15 by, for example, splines 15a and 15b so that the shaft 15 can rotate the tool in the direction of the arrow 5a. The body 75 may be a single piece disk or it may be a disk that carries two separate portions 24 and 25 interconnected to the body by conventional means not shown. The cutting edge carrying zones 24 and 25 range over less than 180° so that sectors 26 define the zones 9 and 11 free of cutting edges. The zones 9 and 11 are large enough to provide the above mentioned work piece exchanging zone. In the area of these cutting edge free zones 9 and 11, the flange of the base body 75 is preferably interrupted all the way to the hub through which the drive shaft 15 extends. As mentioned above and as viewed in the direction of the rotational arrow 5a the cutting edge 8a is considered to be a first cutting edge while the cutting edge 7a is a last cutting edge for defining the beginning and end of the cutting edge carrying section 24.

The portions 24 and 25 are sectors of a circle having the radius R. Each sector 24, 25 with its radius R has a different origin R1 or R2 respectively as shown in FIG. 4. As shown, each radius R has the same length. However, the radii R may have different lengths. The tool carrying drive shaft 15 has a central axis 78 and the origin for R1 and R2 are vertically displaced from this central axis 78 as indicated by the spacings 76 and 77 respectively. As shown, the spacings are equal to each other, different spacings may be provided. Thus, tools may be made which are suitable for very different machining operations. Further, it is possible to divide the sectors 24 and 25 into a plurality of smaller sectors which are then assembled and clamped, for example, between two disks so that the formation of the cutting edge carrying sections or sectors can be very selective, depending on the particular purpose for which the tool is intended.

The embodiment of FIG. 6 is similar to that of FIG. 1 A machine frame 79 is secured to a foundation 97. Two head stocks 80 and 81 slidable on glide tracks 90 and 91 are mounted on the machine frame for movement in the back and forth directions indicated by the arrows 96. Both head stocks 80 and 81 have a common rotation axis 82. Each of the head stocks 80, 81 carries a work piece spindle 83, 84 for rotatably mounting a work piece such as a crankshaft 92. Next to the head stocks 80 and 81 there are two additional head stocks 85 and 86, whereby the head stocks 81 and 85 form one pair of head stocks and the head stocks 80 and 86 form another pair. The head stocks 85 and 86 carry tool carriers or spindles 87 and 88 rotatable about a common central axis 89. The tool carriers 87 and 88 may carry tools as shown in FIGS. 2 and 4 suitable for broaching a crankshaft 92.

In the embodiment of FIG. 6 the machine frame may have a U-configuration leaving a gantry opening 93 for the insertion and removal of work pieces 92. A chip pit may be provided below the portal opening. The adaptability of the machine tool according to FIG. 6 to different work pieces and different machining purposes can be increased by mounting the head stocks 85 and 86 on slide supports 85a and 86a respectively for adjustments in the directions indicated by the arrows 95. Thus, the head stocks 85 and 86 are movable in two directions extending perpendicularly to each other as indicated by the arrows 94 and 95. The arrows 95 indicate a displacement in parallel to the central axis 82 and 89.

The most important advantage of the present machine tool is its adaptability to many different machining requirements, whereby the structure itself is simple and down times have been minimized.

Although the invention has been described with reference to specific example embodiments, it will be appreciated, that it is intended to cover all modifications and equivalents within the scope of the appended claims.

What we claim is:

1. A method for a rotary broaching operation on work pieces in a broaching machine tool, comprising the following steps:
    (a) using, in said machine tool, a tool carrier carrying a plurality of cutting tool edges;
    (b) arranging said cutting tool edges along a first curved section on the tool carrier in a radial plane relative to a work piece, in such a way that a first cutting tool edge and a last cutting tool edge mark the beginning and end of said first curved section with cutting tool edges attached thereto and thereby also mark the beginning and end of a second section on said tool carrier free of cutting tool edges;
    (c) continuously rotating said tool carrier while performing a sequence of broaching operations;
    (d) sensing the presence of said second section free of cutting tool edges in a work piece exchange zone for providing respective control signals;
    (e) loading a work piece into said machine tool when said second section free of cutting tool edges faces said work piece exchange zone without interrupting the motion of said tool carrier;
    (f) unloading a finished work piece after the completion of a broaching operation by said last cutting tool edge when said second section free of cutting tool edges faces said work piece exchange zone,- without interrupting the motion of said tool carrier; and
    (g) controlling said loading and said unloading of a work piece in response to said control signals.

2. A method for a rotary broaching operation on work pieces in a broaching machine tool, comprising the following steps:
    (a) using, in said machine tool, a tool carrier carrying a plurality of cutting tool edges including a first cutting tool edge and a last cutting tool edge;
    (b) sensing the presence of said first and second cutting tool edges in a work piece exchange zone for providing respective control signals;
    (c) loading a work piece into said machine tool and performing a broaching operation on said work piece while rotating said tool carrier in a forward direction;
    (d) continuing to rotate said tool carrier in said forward direction into a work piece exchange zone;
    (e) stopping said tool carrier for the duration of a work piece unloading operation;
    (f) unloading a finished work piece while said tool carrier is stopped; and
    (g) controlling said loading, said unloading of a work piece, and said stopping of said tool carrier in response to said control signals.

3. The method of claim 2, further comprising:
    (a) arranging said cutting tool edges along a first curved section on said tool carrier in a radial plane relative to a work piece, in such a way that said first cutting tool edge and said last cutting tool edge mark the beginning and end of said first curved section with cutting tool edges attached thereto and thereby also mark the beginning and end of a second section on said tool carrier free of cutting tool edges;
    (b) wherein said stopping of said tool carrier is caused when said second section of said tool carrier free of cutting tool edges faces said work piece exchange zone.

4. An apparatus for performing a rotary broaching operation, comprising a machine frame, work piece spindle means mounted in said machine frame for rotation about a machine axis, movable tool carrier means including a plurality of cutting tool edges secured to said movable tool carrier means, whereby said tool carrier means make it possible to move said cutting tool edges along a curved path, means for sensing a first angular position of said tool carrier means for providing a first signal defining a beginning of a broaching cycle, and for sensing a further angular position of said tool carrier means for providing a second signal for the removal of a work piece, whereby the further angular position for the removal of a work piece defines a zone on said tool carrier means which is free of cutting tool edges and which faces the work piece, machine control means for controlling and operating said apparatus, and means connecting said sensing means to said machine control means for producing control signals for controlling the loading and unloading and for controlling at least the beginning of a work cycle.

5. The apparatus of claim 4, further comprising means operatively connected to said work piece spindle means for moving said work piece spindle means into a predetermined, fixed angular position.

6. The apparatus of claim 5, wherein said tool carrier means comprise at least two tool carriers for carrying said cutting tool edges.

7. The apparatus of claim 6, further comprising carrier drum means for supporting said tool carrier means, and means for rotationally mounting said carrier drum means in said machine frame.

8. The apparatus of claim 7, wherein said mounting means for said carrier drum means locate a rotational axis of said carrier drum means outside of said machine axis.

9. The apparatus of claim 8, wherein said rotational axis of said carrier drum means extends in parallel to the machine axis.

10. The apparatus of claim 4, wherein said tool carrier means comprise tool carrying spindles arranged in parallel to each other.

11. The apparatus of claim 10, further comprising at least one tool carrier drum means for said tool carrying spindles and means for rotatably mounting said tool carrier drum means in said machine frame.

12. The apparatus of claim 11, wherein said carrier drum means comprise a carrier drum for each of said tool carrying spindles, said machine control means comprising drive means connected to said carrier drums for rotating the respective carrier drum into at least two predetermined angular positions.

13. The apparatus of claim 4, wherein said work piece spindle means comprise at least two work piece spindles.

14. The apparatus of claim 13, further comprising work piece drum means for carrying said work piece spindles, and means for rotatably mounting said work piece drums carrying said work piece spindles.

15. The apparatus of claim 4, wherein said cutting tool edges are arranged circumferentially along a first section on said tool carrier means in such a way that at least one second circumferential section of said tool carrier means remains free of cutting tool edges for forming a work piece removal gap which is free of said cutting tool edges.

16. The apparatus of claim 4, comprising at least two head stocks arranged on said machine frame opposite each other and having a center axis in common with said work piece spindle means, said apparatus further comprising at least one additional head stock for rotatably supporting said tool carrier means and having a further central axis for said tool carrier means extending in parallel to said common center axis of said work piece spindle means.

17. The apparatus of claim 16, wherein said machine control means comprise drive means for each head stock of said tool carrier means arranged for displacing the respective head stock in parallel to said center axis in common with said work piece spindle means and for positioning the respective head stock.

18. The apparatus of claim 17, further comprising means for displacing and positioning each head stock of said tool carrier means vertically to said center axis in common with said work piece spindle means.

19. The apparatus of claim 18, further comprising means for displacing and positioning each head stock for said work piece spindle means.

20. The apparatus of claim 19, wherein said machine frame is arranged in a vertical orientation while said spindles have rotational axes extending horizontally.

21. The apparatus of claim 20, wherein said machine frame is constructed as a portal frame.

22. The apparatus of claim 21, wherein each head stock for said tool carrier means is arranged above the respective work piece spindle means.

23. The apparatus of claim 4, wherein said machine control means comprise means for variably controlling the rotational speed of the work piece spindle means and/or of said tool carrier means.

* * * * *

UNITED STATES PATENT AND TRADEMARK OFFICE
CERTIFICATE OF CORRECTION

PATENT NO. : 4,799,839

DATED : January 24, 1989

INVENTOR(S) : Garri Berstein, Hans W. Obrig, Helmut Wittkopp, Hermann Wolters

It is certified that error appears in the above-identified patent and that said Letters Patent is hereby corrected as shown below:

Claim 2, (Column 14, line 41, item (b)) replace "second" by --last--.

Signed and Sealed this

Fifth Day of September, 1989

Attest:

DONALD J. QUIGG

Attesting Officer

Commissioner of Patents and Trademarks